US005324568A

United States Patent [19]

Coninx et al.

[11] Patent Number: 5,324,568
[45] Date of Patent: Jun. 28, 1994

[54] GLAZING PANE WITH REDUCED LIGHT TRANSMITTANCE AND METHOD OF MANUFACTURING SAME

[75] Inventors: Max Coninx, Herzogentrath; Dieter Hahn, Ubach-Palenberg; Winfried Stolzenberg, Cologne, all of Fed. Rep. of Germany

[73] Assignee: St. Gobain Vitrage, Courbevoie, France

[21] Appl. No.: 939,503

[22] Filed: Sep. 2, 1992

[30] Foreign Application Priority Data

Sep. 6, 1991 [DE] Fed. Rep. of Germany ....... 4129578

[51] Int. Cl.$^5$ ............................................. B32B 9/00
[52] U.S. Cl. ................................. 428/195; 428/428; 428/426; 296/84.1; 296/118; 52/306; 52/307
[58] Field of Search ............... 428/195, 428, 131, 426; 296/84.1, 118; 52/306, 307

[56] References Cited

U.S. PATENT DOCUMENTS

| 3,652,370 | 3/1972 | Motai | 116/2 |
| 3,895,859 | 7/1975 | Yoshida et al. | 350/276 R |
| 4,167,839 | 9/1979 | Nielsen et al. | 52/105 |
| 4,634,231 | 1/1987 | Poncelet et al. | 350/311 |

FOREIGN PATENT DOCUMENTS 4013300  1/1991  Fed. Rep. of Germany ... B60J 3/00

*Primary Examiner*—Patrick J. Ryan
*Assistant Examiner*—Abraham Bahta
*Attorney, Agent, or Firm*—Pennie & Edmonds

[57] ABSTRACT

A roof window pane for automobiles possesses, on the face towards the passenger compartment, a grating-type pattern of a material which impedes the passage of radiation, especially a baking finish. The grating-type pattern consists of superimposed gratings and has a moire structure.

8 Claims, 2 Drawing Sheets

GLAZING PANE WITH REDUCED LIGHT TRANSMITTANCE AND METHOD OF MANUFACTURING SAME

FIELD OF THE INVENTION

This invention relates to a glazing pane with reduced transmittance for light and heat radiation, comprising a grating-type or screen-type pattern of a material which impedes or attenuates the passage of radiation, disposed on one surface.

BACKGROUND OF THE INVENTION

Panes of the above described type are known and are used for various purposes. From DE-OS 19 51 616, a glass pane of this type is known, wherein the pattern preferably consists of an opaque or semitransparent baking finish having a light transmittance of 0 to 40%. The fragments constituting the grating pattern, which may be square, rectangular, circular or elliptical, are said to have a length of 0.1 to about 20 mm, and the spacing or gap between the small fragments is to be 0.1 to 10 mm. The fragments may be in contact with one another, resulting in a hole grating. The glass panes having patterns of this type are intended for use as antidazzle panes or as heat protective panes, and are used, for example, also in automobiles.

From DE-AS 23 61 669, a dazzle-reducing window of the initially named type is also known, preferably for automobiles. In this known window, on the surface of the glass pane provided with the pattern, a frame-like solid strip of the opaque material is provided along its edge, by which the edges of the window frame are to be concealed from view. For the case where the glass panes are glued to the window frame, the solid frame-like edge strip serves also as a protection against ultraviolet radiation, which otherwise would lead to embrittlement of the adhesive.

In DE 27 13 892 C2, a glass pane with a pattern in the form of dots on one of its faces is described, the dots being applied in such a distribution that the sum of the surface regions of the opaque dots covers 10 to 30% of the glass surface, the size of the dots being so chosen that from 12 to 20 dots per centimeter lie in each direction. A pane of this type is intended to be used predominantly in a sports hall or games hall as a viewing wall.

EP 0 120 781 describes a glass pane of the initially named type, particularly suitable for a glass roof of an automobile. For this intended application, the pattern of opaque baking finish is to be sufficiently dense for the light transmission and accordingly the total energy transmission to be less than 30% and preferably less than 15%.

The known patterns consist of grating-like or screen-like structures, in which the individual fragments of the coating which impedes or attenuates the passage of radiation and the radiation-transmitting holes each have a constant size and are uniformly and homogeneously distributed over the entire pattern and over the entire glass surface. In specific cases, in which the light transmission is to vary from a high value to a low value, or vice versa, within the grating-like structures, grating structures are used, in which the individual fragments of the layer, or radiation-transmitting holes as the case may be in the layer, become smaller or larger by steps in one direction, whereas in the direction transversely to this they each have a constant size. Such structures are employed, especially, in dazzle-reducing filter bands in the upper region of windscreens and in the transition region between the opaque decorative frame and the fully transparent viewing area of automobile glass panes.

It has been found that the human eye is especially sensitive to uniform structures of this type and that, if the grating structure is viewed critically, as for example occurs in the production inspection of the glass panes, even very small defects are evident. If, for example, therefore a single small fragment of the grating is missing on a glass pane printed with such a uniform grating, or if only one single hole of the hole grating is closed, this leads as a rule to this defect being evident on inspection and the glass pane consequently having to be rejected.

Irregularities in the printed grating become all the more readily visible to the human eye, the higher the degree of cover of the glass pane is. In specific cases, the printed glass panes must have a very low transmission of less than about 30%, namely for example in the case where such glass panes are used as automobile roof windows. In this case, the panes are printed as a rule with an opaque, black baking finish. In other cases, for example for use in ambulance vehicles, the requirement exists that the lateral panes shall be made non-transparent when viewed from the outside by printing with an opaque, white paint, but shall permit sufficient vision in the opposite direction. If this effect is to be achieved with a surface-covering print, a high reflection is obtained on the outer face of the glass pane, by which any slight deformations or surface irregularities of the pane are emphasized. If, instead, the printing is carried out with a uniform grating print, then once again the aforementioned difficulty arises that very small defects in the grating print are easily recognizable by the eye in reflection or in transmission.

SUMMARY OF THE INVENTION

The objective of the present invention is so to construct glass panes with reduced light transmission of the initially named type that any defects in the grating pattern that occur do not strike the eye. In particular glass panes having an especially high degree of coverage, that is to say with a very low transmission degree, must be able to be produced, without perturbing secondary effects occurring due to the high degree of coverage.

According to this invention, this objective is achieved in that the grating-like pattern consists of the combination of different gratings, particularly a coarse and a fine grating, in such a manner that in a structure that is uniform when viewed over a large area, larger and smaller fragments of the opaque or light-impeding parts of the pattern and/or of the light-transmitting holes alternate.

It has been found that the eye reacts much less to small irregularities or defects in the grating structure if this structure is formed in the manner according to this invention. Since the grating structure according to this invention already itself varies, the human eye detects small irregularities much less strongly than in the case of a very uniform pattern. Even compared with a glass pane having a full-area, that is to say area-covering coating with a partly transparent film or with an opaque film, a film with a structure formed according to this invention has the substantial advantage that small surface deformations or other surface and coating errors, which are particularly noticeable in reflected light, are much less apparent.

By the construction of the glass panes according to this invention, it moreover becomes possible to manufacture glass panes having a very high degree of coverage and accordingly very low degree of transmission, and this can be done without the risk of a high rate of rejection in the production of the glass panes.

Basically, the glass panes according to this invention can be produced, for example, by superimposing, upon a conventional, uniformly fine hole grating with holes of uniform size, a line grating the lines and gaps of which between the lines each have dimensions in width that correspond to a multiple of the hole diameter or of the spacing between the holes of the hole grating. Instead of a line grating, a coarse dot grating or a coarse hole grating may be combined with a fine hole grating. Overall, by the combination of the two gratings, a grating having a uniform macrostructure is again obtained, but with a non-uniform microstructure.

Preferably, the hole diameter of the fine grating is 0.3 to 0.6 mm, and the degree of coverage of the combined pattern is 75 to 98%. A subject of this invention is also an especially favorable method for the production of printing prototypes for glass panes constructed according to this invention. This method consists in that, by superimposing two uniform hole, dot or line gratings with relative angular displacement of the two gratings, moire-like pattern structures can be created, which serve as a prototype for the production of printing screens for the screens for the screen printing process. As a result, in a very simple manner and with the use of existing hole grating prototypes, extremely different grating structures with different transmission degrees can be produced.

Preferably, two uniform hole gratings with a diameter of the holes of 0.4 to 0.6 mm and a distance between adjacent holes of 0.3 to 0.6 mm are combined with one another at an angle of 5 to 45 degrees.

Examples of embodiment of the invention are described in more detail below with reference to the drawings.

DETAILED DESCRIPTION

The gratings illustrated are suitable, for example, for the production of automobile window panes of single-pane safety glass, which are provided with a grating imprint of a baking finish by the screen printing method before they are thermally toughened. In the case of roof window panes opaque coatings of, for example, black baking finish may be used. In the case of side windows, which are to have a reduced light transmittance and, for example, prevent viewing from the outside inwards, light-scattering coatings may be used, for example of a baking finish with white colour pigments.

The printing screens for carrying out the screen printing process are made in the usual way, by coating the screen printing fabric with a photo-sensitive coating, which is exposed through a sheet having the desired pattern, as described for example in U.S. Pat. No. 3,813,519.

Figure 1:
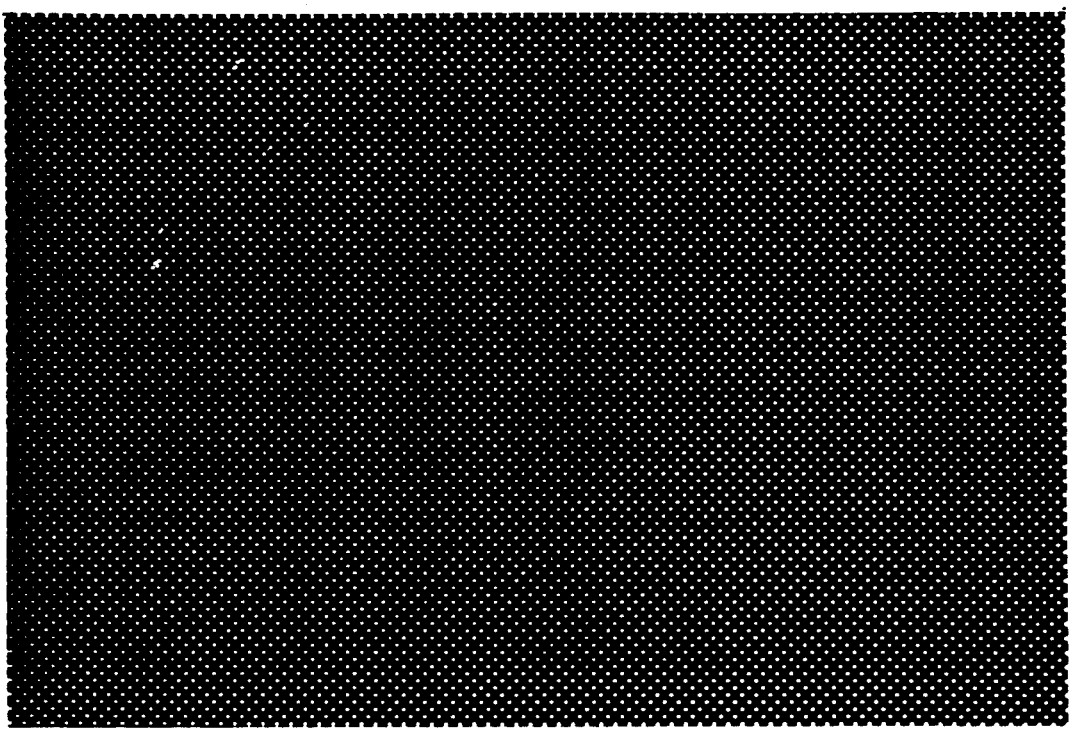
FIG. 1 shows a hole grating commonly used for producing roof window panes for automobiles (state of the art)

In the state of the art, for the production of the printing screen a sheet having a hole grating is used, as illustrated enlarged in FIG. 1. The individual holes of the grating have, for example, a diameter of 0.5 mm and mutual spacing between holes of 0.4 mm and are staggered in successive rows, the holes of one row opposite the gaps of the next. A hole grating of this type has a total degree of coverage of 75%, that is 25% of the pane surface is not covered. A glass pane having a grating of this type of a conventional black, substantially opaque screen printing ink, has a total light transmission degree TL of 15 to 25% and total energy transmission degree TE of 12 to 22%.

Figure 2:
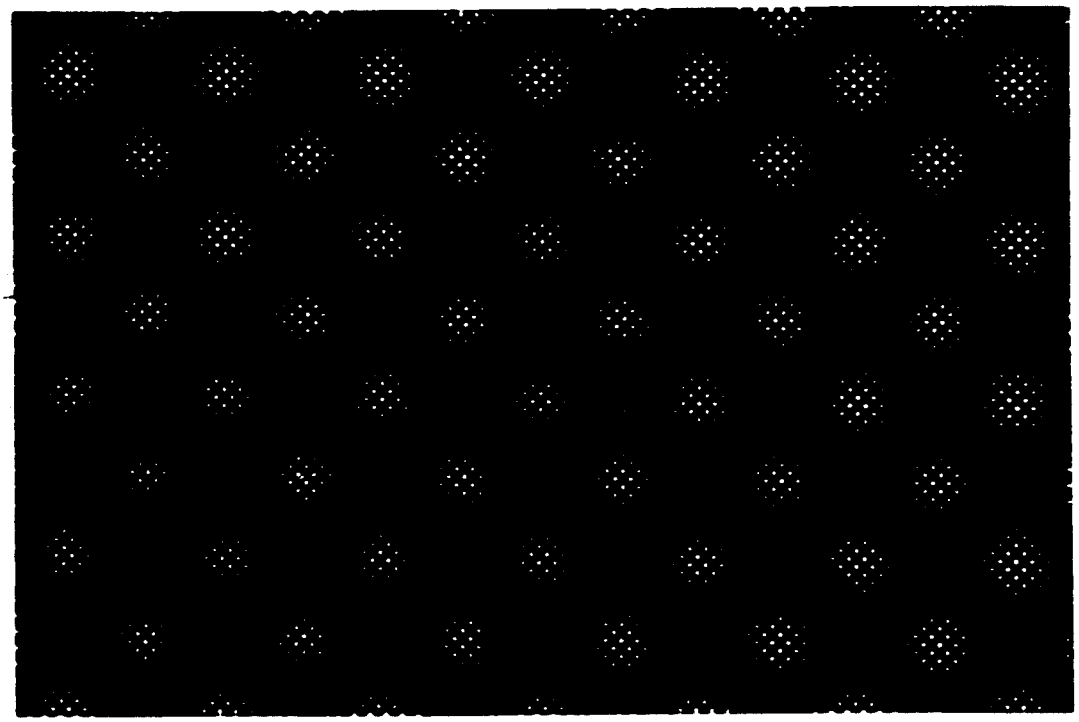
FIG. 2 shows a first form of embodiment of a printing grating according to this invention.

If two grating sheets of the type illustrated in FIG. 1 are laid one over the other with a relative angle of displacement of 5 to 7 degrees, an interference pattern is obtained, as shown in FIG. 2. The exposure of the printing screen coated with the photosensitive coating is therefore performed through two superimposed sheets. By means of two identical grating sheets according to FIG. I, in this way a very wide variety of grating structures can be produced in the printing screen, which all exhibit the properties according to this invention.

The grating pattern illustrated in FIG. 2 has a substantially higher degree of coverage than the grating pattern according to FIG. 1. In addition to the favourable effect with regard to the appearance of the glass pane, a substantial reduction in the total energy transmission is also obtained.

Figure 3:
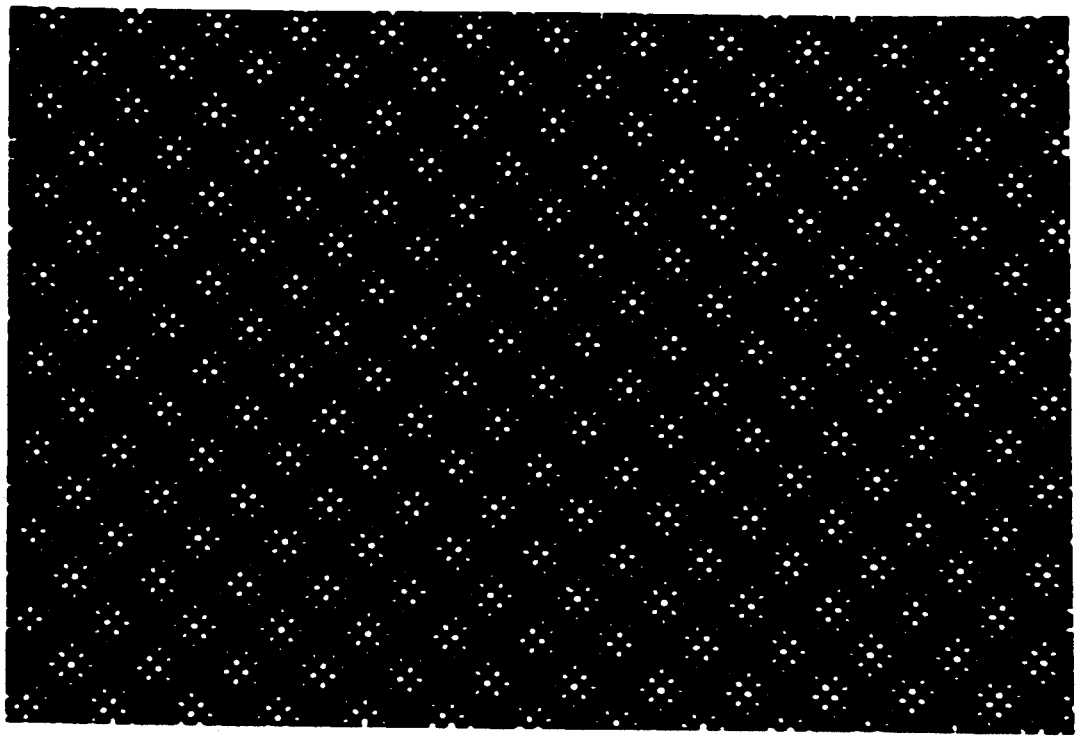
FIG. 3 shows another form of embodiment of a printing grating according to this invention.

If, in the production of the printing screen, the two superimposed grating sheets each having the structure of FIG. 1 are further rotated relative to each other, then with an angle of rotation of about 15 degrees a grating pattern corresponding to FIG. 3 is obtained. This grating pattern has a still further increased degree of coverage and possesses a total light transmission degree TL of 5 to 6% and a total energy transmission degree TE of 7 to 8%.

Figure 4:
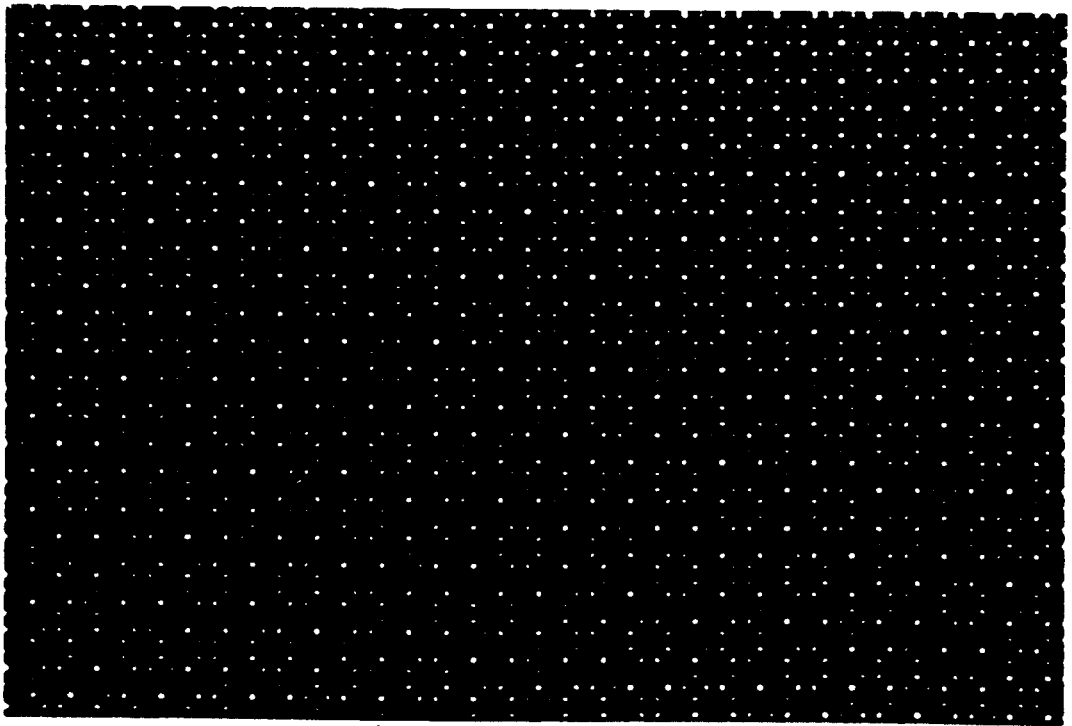
FIG. 4 shows a further form of embodiment of a printing grating according to this invention.

A still further increase in the degree of coverage with further change to the grating structure can be obtained by further increasing the angular displacement between the two gratings sheets in the production of the printing screen. FIG. 4 shows, for example, a grating pattern having the properties according to this invention, which is obtained by an angle of rotation of about 30 degrees.

We claim:

1. A glazing pane having reduced transmission for light and heat radiation, comprising a grating pattern of a material that impedes or attenuates passage of said radiation on one face, said grating pattern comprising a plurality of gratings, which appears uniform when viewed over a large area and which include fragments of the opaque or light-attenuating parts of the pattern of varying sizes wherein the fragments with larger sizes alternate with the fragments of smaller sizes.

2. Glazing pane according to claim 1, wherein the grating pattern comprises a uniform hole grating with holes of constant size, and a uniform line grating, wherein the lines and the gaps between the lines each have width dimensions that correspond either to a multiple of the hole diameter or of the spacing between the holes of the hole grating.

3. Glazing pane according to claim 1, characterized in that the grating pattern consists of the combination of a uniform fine hole grating and of uniform coarse hole or dot grating.

4. Glazing pane according to any one of claims 1 to 3, characterized in that the hole diameter of the fine grating is 0.3 to 0.6 mm, and the degree of coverage of the combined pattern is 75 to 98%.

5. Glazing pane with reduced transmittance for light and thermal radiation, comprising a grating-type pattern of a material that impedes or attenuates passage of radiation disposed on one surface, characterized in that the grating like pattern consists of a moire pattern.

6. A glazing pane according to claim 1 or 5 constructed as a roof window pane or as side window pane for automobiles.

7. Glazing pane according to claim 1, wherein the combination of the plurality of gratings comprises coarse and fine grating.

8. Glazing pane according to claim 7, wherein the light transmitting holes formed by the opaque fragments are of varying sizes, wherein the holes with larger sizes alternate with holes of smaller sizes.

* * * * *